(12) United States Patent  (10) Patent No.: US 7,440,120 B2
Parlour  (45) Date of Patent: Oct. 21, 2008

(54) INTERNAL AND EXTERNAL MEASURING DEVICE

(75) Inventor: Noel S. Parlour, Bolingbrook, IL (US)

(73) Assignee: Barbara E. Parlour, Bolingbrook, IL (US)

( * ) Notice: Subject to any disclaimer, the term of this patent is extended or adjusted under 35 U.S.C. 154(b) by 0 days.

(21) Appl. No.: 11/769,043

(22) Filed: Jun. 27, 2007

(65) Prior Publication Data

US 2008/0043252 A1 Feb. 21, 2008

Related U.S. Application Data

(60) Provisional application No. 60/805,948, filed on Jun. 27, 2006.

(51) Int. Cl.
 G01B 11/00 (2006.01)
 G01N 21/00 (2006.01)
(52) U.S. Cl. .................................. 356/626; 356/241.1
(58) Field of Classification Search ................. 356/626, 356/241.1
 See application file for complete search history.

(56) References Cited

U.S. PATENT DOCUMENTS

| | | | |
|---|---|---|---|
| 4,440,496 A * | 4/1984 | Milana | 356/241.1 |
| 4,853,745 A | 8/1989 | Kamyia et al. | |
| 5,104,227 A | 4/1992 | Uesugi et al. | |
| 5,235,398 A | 8/1993 | Miller et al. | |
| 5,315,374 A | 5/1994 | Yoshizumi | |
| 5,325,177 A | 6/1994 | Peterson | |
| 5,392,122 A | 2/1995 | Ulanov et al. | |
| 5,430,547 A | 7/1995 | Takagi et al. | |
| 5,530,549 A | 6/1996 | Brown | |
| 5,616,916 A | 4/1997 | Handa et al. | |
| 5,686,996 A | 11/1997 | Fidler, Jr. | |
| 5,771,100 A | 6/1998 | Kawai et al. | |
| 5,917,181 A | 6/1999 | Yoshizumi et al. | |
| 6,043,891 A | 3/2000 | Hartrumpf et al. | |
| 6,128,585 A | 10/2000 | Greer | |
| 6,157,157 A | 12/2000 | Prentice et al. | |
| 6,647,632 B2 | 11/2003 | Tominaga et al. | |
| 6,760,117 B2 | 7/2004 | Slatter | |
| 6,765,671 B2 | 7/2004 | Priestley | |
| 6,798,527 B2 | 9/2004 | Fukumoto et al. | |
| 6,822,748 B2 | 11/2004 | Johnston et al. | |
| 6,956,661 B2 | 10/2005 | Tutschke | |
| 7,000,839 B2 | 2/2006 | Goode et al. | |
| 7,012,247 B2 | 3/2006 | Tassakos et al. | |
| 7,110,124 B2 | 9/2006 | Jensen et al. | |
| 2003/0024122 A1 | 2/2003 | Ichiyama et al. | |

* cited by examiner

Primary Examiner—Gregory J. Toatley, Jr.
Assistant Examiner—Amanda H Merlino
(74) Attorney, Agent, or Firm—Cook Alex Ltd.

(57) ABSTRACT

A measuring device for measuring internal or external dimensions of a manufactured or machined component is provided with a laser source, a beam redirection member, and a beam receptor. The beam redirection member is adapted to be positioned within an internal bore of a subject component. The laser source directs a beam downwardly to be intercepted by the beam redirection member. The beam exits the beam redirection member at approximately 90° from its original direction to strike a target area along the internal bore of the subject component. The beam is reflected back to the beam redirection member, which directs it at an upward angle to be received by the beam receptor. The beam receptor transmits the data to a control system, which calculates the dimension of the target area. Also provided are methods for optimizing the accuracy of measurements taken by the measuring device.

10 Claims, 16 Drawing Sheets

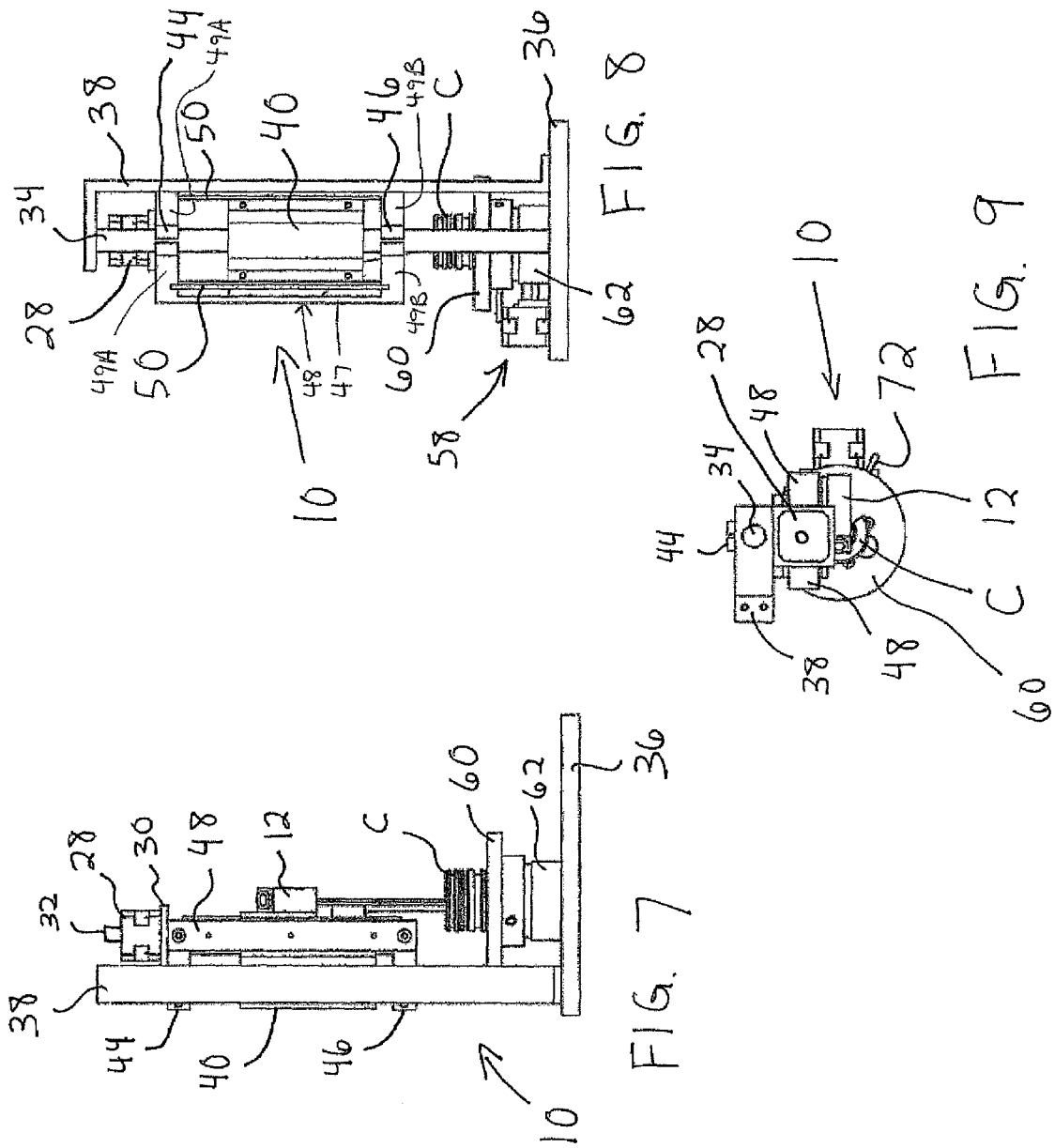

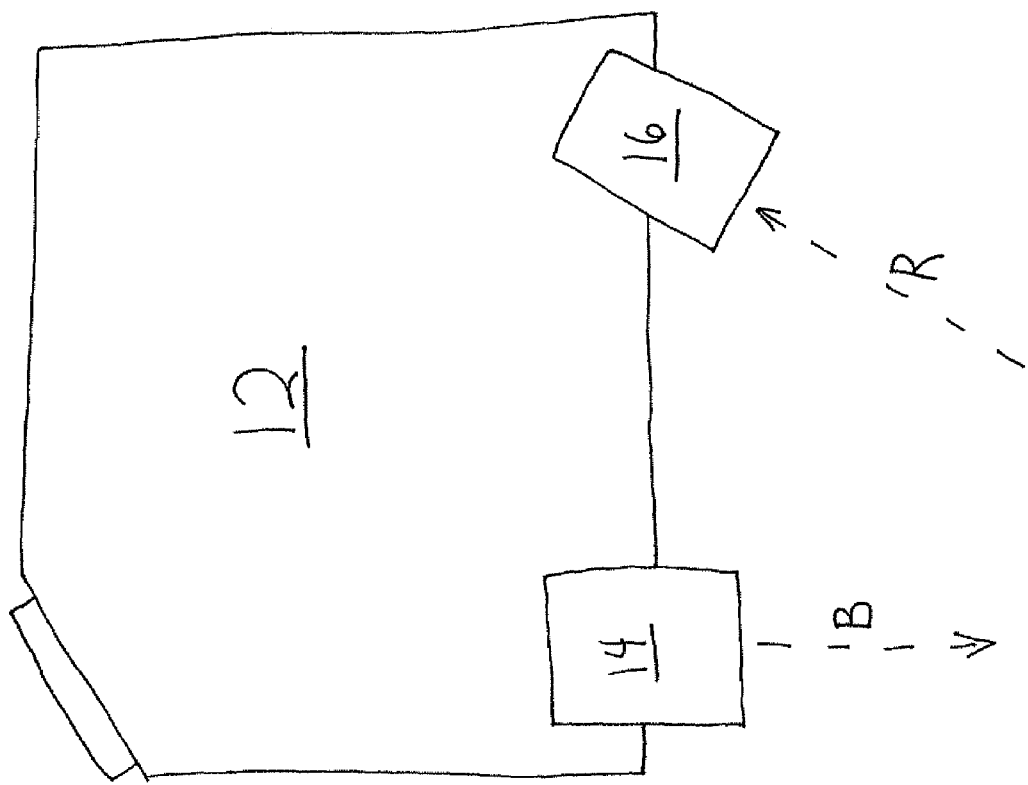

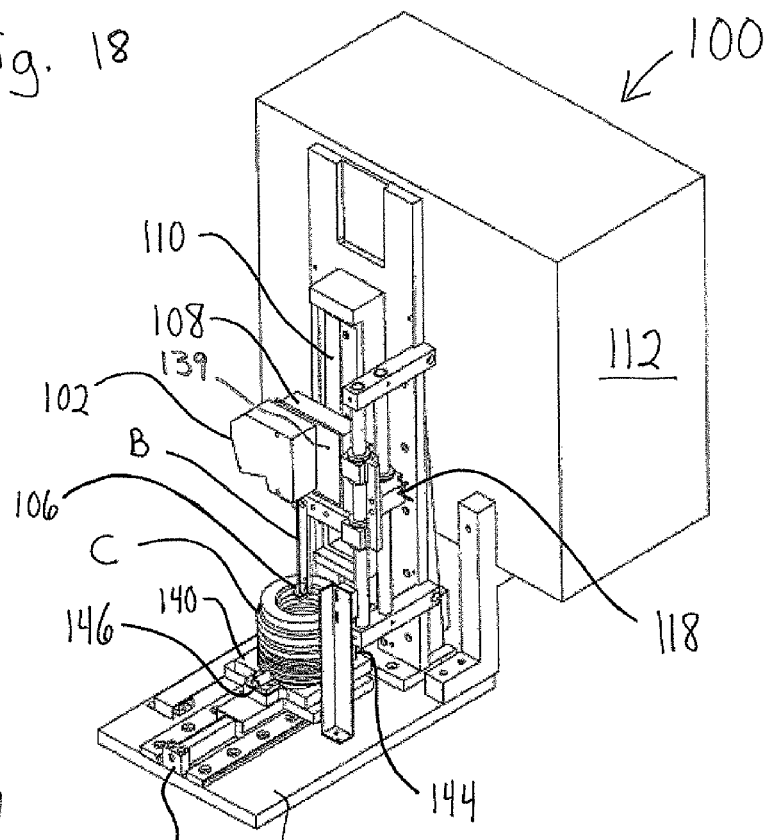
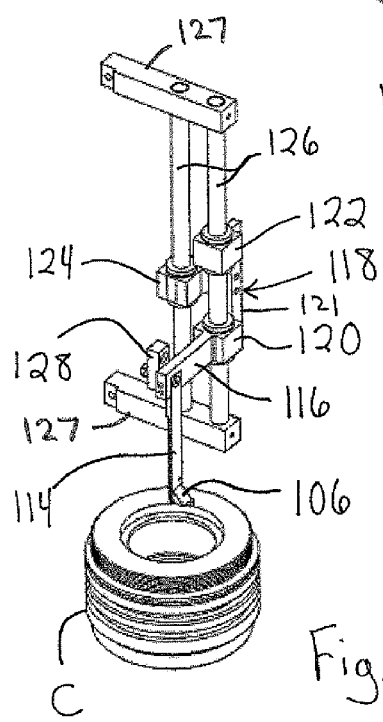
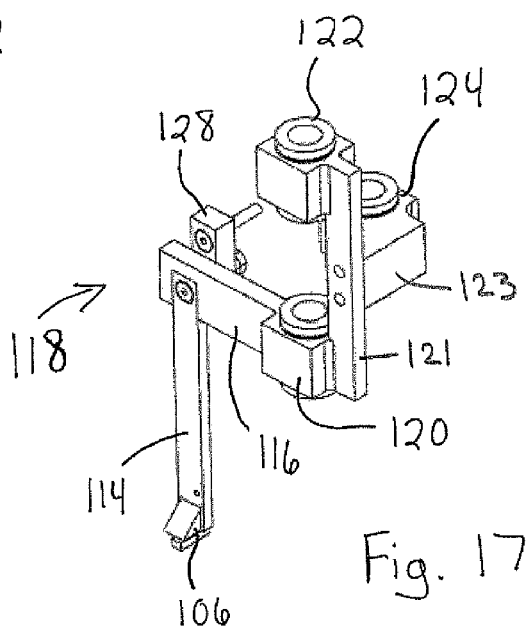

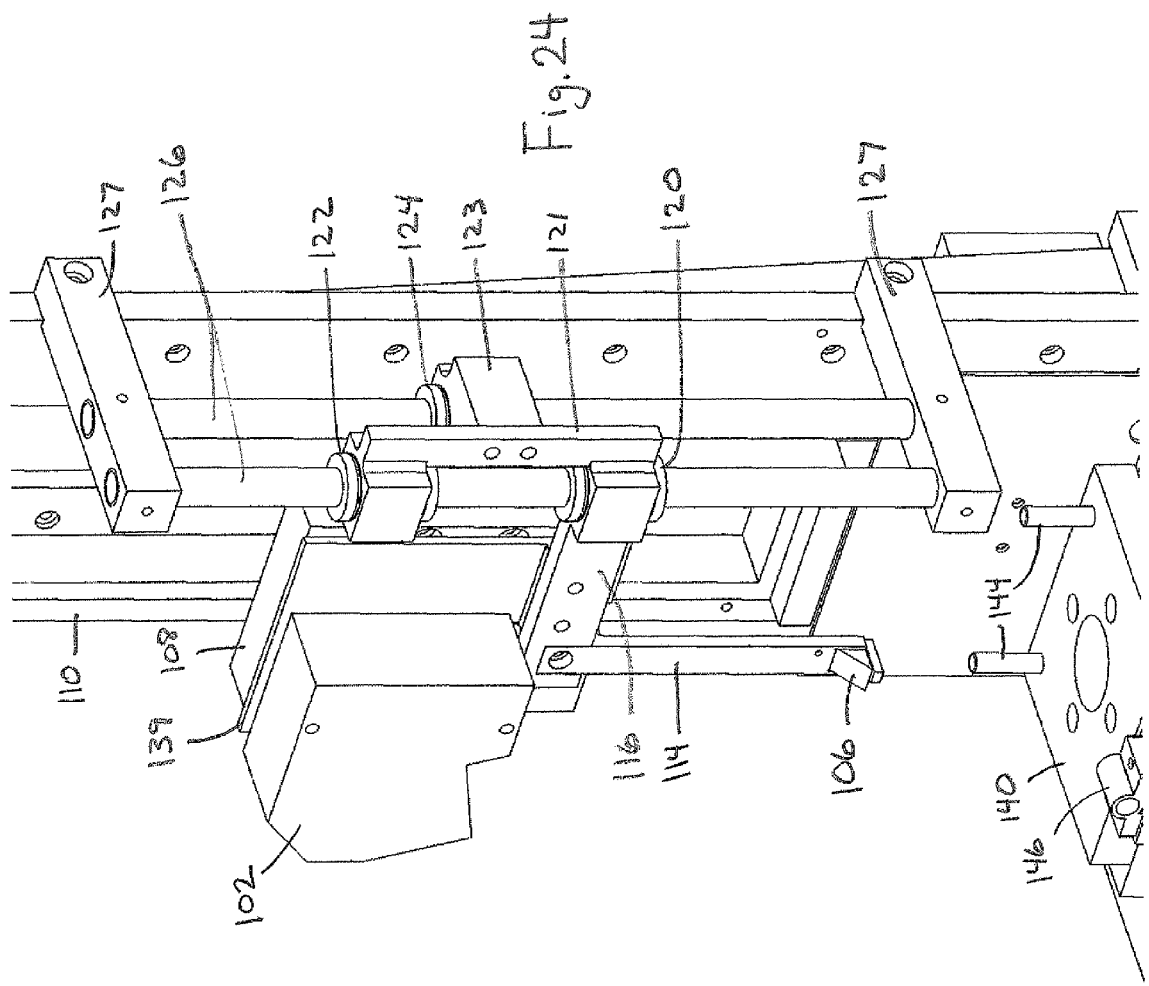

INTERNAL AND EXTERNAL MEASURING DEVICE

CROSS-REFERENCE TO RELATED APPLICATIONS

This application claims priority from and the benefit of provisional patent application Ser. No. 60/805,948, filed Jun. 27, 2006, which is hereby incorporated herein by reference.

BACKGROUND

1. Field of the Disclosure

This disclosure generally relates to devices for measuring dimensions of a manufactured or machined component using a laser. More particularly, this disclosure relates to devices using a laser to measure at least an interior or exterior dimension of a manufactured or machined component.

2. Description of Related Art

A number of devices and methods are known for using lasers to measure distance and relative position. For example, triangulation, interferometry, "time-of-flight" measurement, and other methods are useful in various applications. Laser-based measurements may be preferred to taking physical measurements for applications requiring measurement of great distances or contact-free measurement or a high degree of accuracy.

Manufactured or machined components are commonly measured using laser-based devices and methods. In order for complex machinery, such as automobiles, to function as designed, the individual components must fit together well, with care taken to avoid excessive or incompatible tolerance variations. Laser-based measurements are preferred over physical measurements because they are typically more accurate, more quickly accomplished, and do not require physical contact with the subject component.

Dimensions of larger components, such as assembled automobile frames can be easily measured using typical laser-based devices and methods, oftentimes triangulation. A difficulty arises, however, when it is necessary to measure an interior dimension of a smaller component. For example, FIG. 1 illustrates a small-diameter component "C", which can be understood as a metal bushing having an irregular inner diameter with dimensions in the range of ¾ to 3 inches. According to known methods, a laser carrier is provided with a laser source spaced a known distance from a receptor. The laser source is suspended a known distance above a stage and aimed downwardly to project a laser that strikes a component positioned on the stage. The laser strikes a portion of the component and is reflected upwardly at an angle to be received by the receptor. Thereafter, a computer associated with the laser carrier uses the known parameters to triangulate the relative position of the target area of the component and a dimension thereof.

The above-described triangulation method is only suitable for analyzing surfaces perpendicular to the axis of the laser. For example, an outer diameter or the height of the component C may be measured by orienting the surface of interest in the downward path of the laser. Thus, it will be appreciated that the dimensions of an internal bore of the component C cannot be directly measured without cutting the component C into a pair of arcuate portions or otherwise damaging the component C.

Accordingly, there remains a need for an improved laser-based measurement device which overcomes the above-described drawbacks of known devices.

SUMMARY

In accordance with the present disclosure, a measuring device for measuring internal dimensions of a manufactured or machined component is provided with a laser source, a beam redirection member, and a beam receptor. The beam redirection member is adapted to be positioned within an internal bore of a subject component. The laser source directs a beam downwardly to be intercepted by the beam redirection member. The beam exits the beam redirection member at 90° from its original direction to strike a target area along the internal bore of the subject component. The beam is reflected back to the beam redirection member, which directs it at an upward angle to be received by the beam receptor. The beam receptor transmits the data to a control system, which calculates the dimension of the target area.

According to one embodiment, at least one of the laser source and the beam redirection member are mounted for vertical movement on a yoke. The yoke is vertically movable by operation of a primary drive system. A drive block is driven by the primary system and may deviate from a purely vertical path, whereas the yoke is constrained for purely vertical movement To eliminate any sway associated with moving the laser source and the beam redirection member, a deformable member is secured between the drive block and the yoke. The deformable member absorbs any sway from the drive block and imparts only a vertical forces to the yoke. At least one of the laser source and the beam redirection member is secured to the yoke to prevent sway of the element so secured.

According to a method of optimizing the accuracy of measurements taken by the measuring device, a set-up piece having known dimensions is provided and measured. Any variations in the measured dimensions from the known dimensions represents a variation in the actual position of the set-up piece from the ideal position. Rather than correcting the position of the set-up piece, a compensation factor is formulated to be used to adjust future measurements.

BRIEF DESCRIPTION OF THE DRAWINGS

FIG. 7 is a left side elevation view of the measuring device of FIG. 2.

FIG. 8 is a rear elevation view of the measuring device of FIG. 2.

FIG. 9 is a top plan view of the measuring device of FIG. 2.

FIG. 10 is a diagrammatic front elevation view of a laser head suitable for use with the measuring device of the present disclosure.

FIG. 12 is a front perspective view of a component stage suitable for use with a measuring device according to the present disclosure.

FIG. 16 is a front perspective view of a stabilizing yoke assembly of the measurement device of FIG. 14, looking generally from the left side of the device.

FIG. 17 is a front perspective view of a yoke of the stabilizing yoke assembly of FIG. 16, looking generally from the right side of the device.

FIG. 18 is a front perspective view of another embodiment of a laser-based measurement device according to the present disclosure, looking generally from the right side of the device.

FIG. 24 is an enlarged front perspective view similar to FIG. 14.

DETAILED DESCRIPTION OF THE ILLUSTRATED EMBODIMENTS

Figure 1:
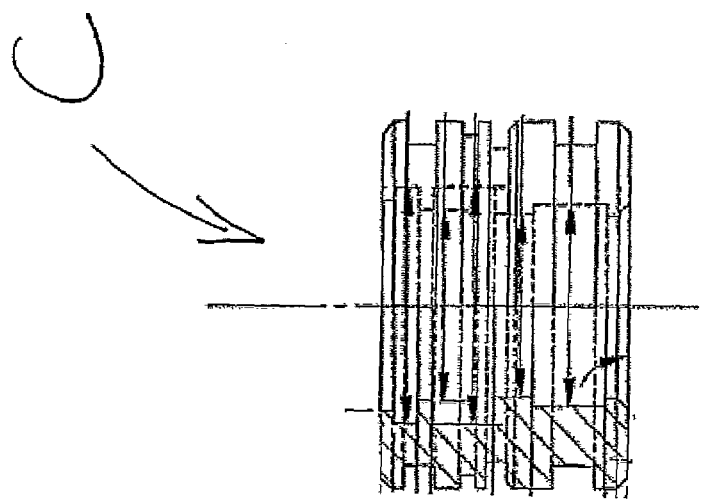
FIG. 1 is a partial cross-sectional view of a manufactured or machined component to be measured.
Figure 2:
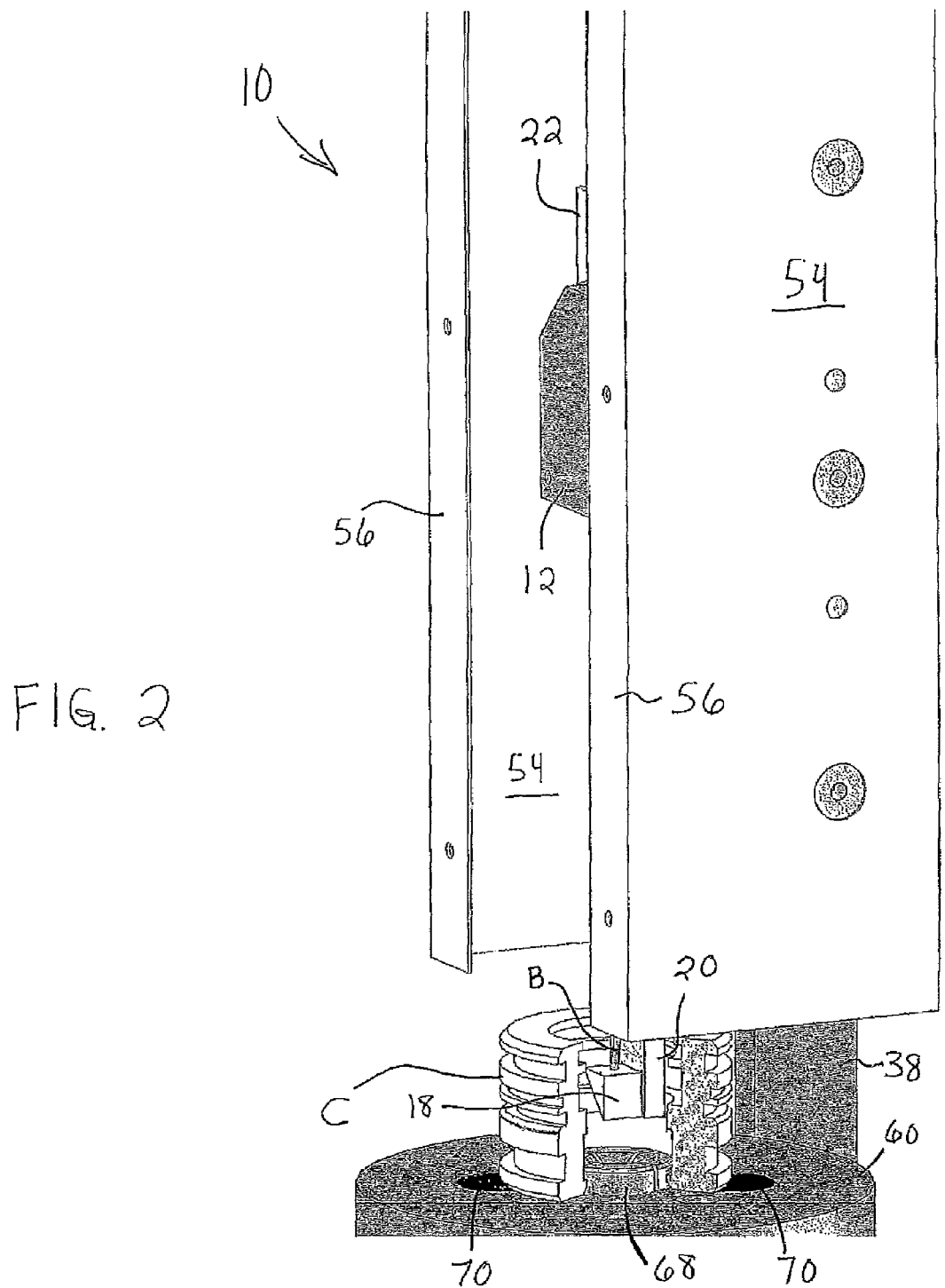
FIG. 2 is a front perspective view of a laser-based measurement device according to the present disclosure, with a portion of a component to be measured broken away for clarity.

FIGS. 2-9 show one embodiment of a laser-based measurement device 10. The figures illustrate the measuring device 10 in use, with the component C of FIG. 1 as a work piece, i.e., the object to be measured. In FIG. 2 a portion of component C is broken away to show how portions of the measuring device can be inserted into the interior of the work piece for taking internal measurements.

The measuring device 10 includes a laser head 12. The laser head 12 itself may be conventional. As best illustrated in FIG. 10 the laser head includes a laser source 14 and a beam receptor 16. The laser source 14 directs a laser beam B downwardly. The beam receptor 16 is spaced a known, fixed distance from the laser source 14 to receive the reflected laser beam, illustrated generally at "R". An example of a known laser head suitable for use with a measuring device according to the present invention is described in U.S. Pat. No. 7,012,247 to Tassakos et al., the disclosure of which is hereby incorporated herein by reference. A particular laser head suitable for this application is available from Micro-Optronic of Langebrueck, Germany, such as their model number optoNCTD 1700, or from Keyence.

The laser beam B is directed to be intercepted by a beam redirection member 18. In the embodiment illustrated in FIGS. 2 and 3 the beam redirection member is a right angle prism. Suitable prisms include those sold by Edmund Optics, Inc. of Barrington, N.J. under the trademark "Tech Spec". In one embodiment, illustrated in FIG. 11, the beam redirection member 18 is a right prism having a height "H" and width "W" of approximately 10.0 millimeters and a hypotenuse "P" of approximately 14.14 millimeters. The prism may be comprised of fused silica or any other material suitable for laser optics. It will be understood that the sizes given are for illustrative purposes only. Different size prisms could be used, depending on the particular application. Indeed, the beam redirection member need not necessarily be a prism as other optical devices, such as a mirror, could be used to effect redirection of the beam.

Figure 3:
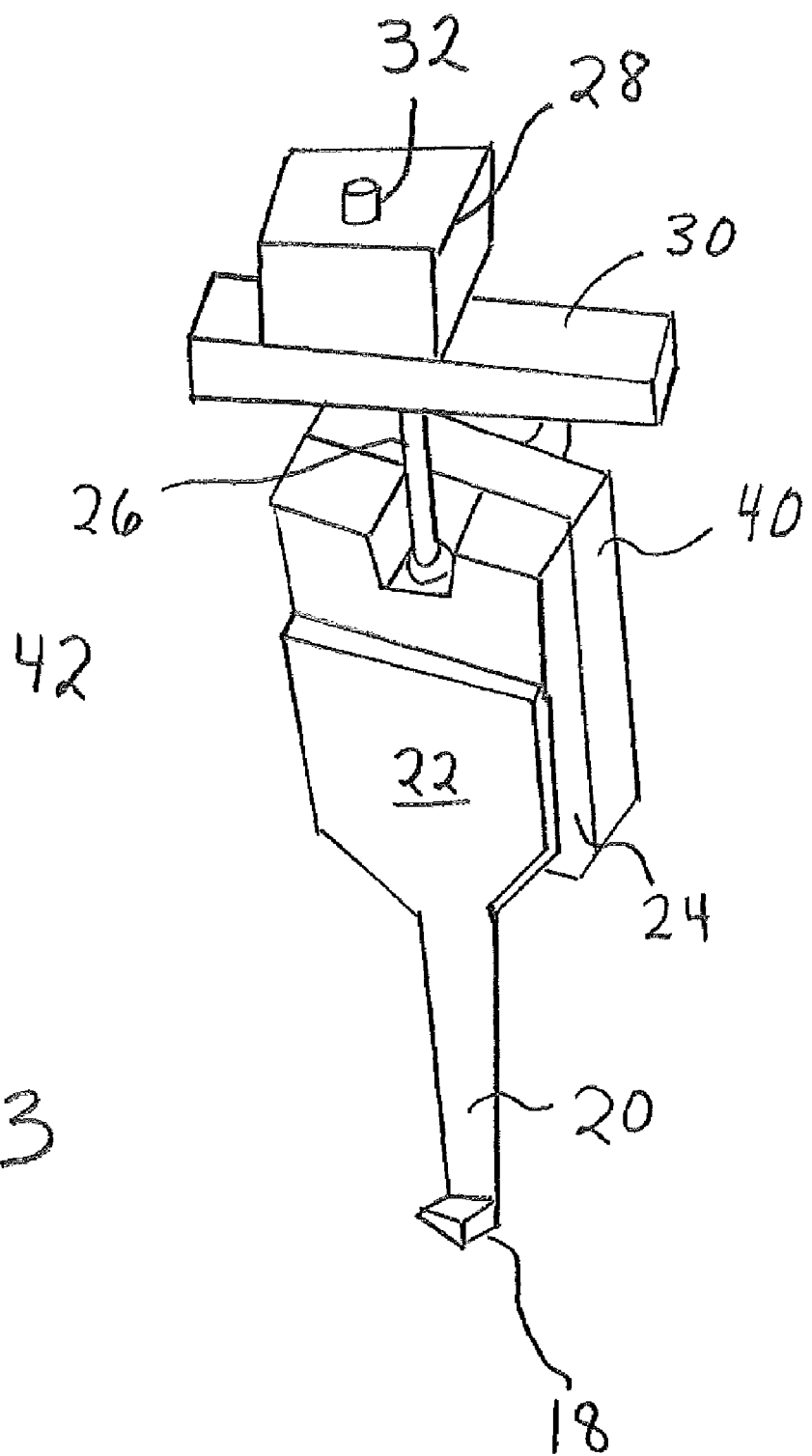
FIG. 3 is a front perspective view of selected elements of a movable laser assembly suitable for use with the measuring device of FIG. 2.
Figure 4:
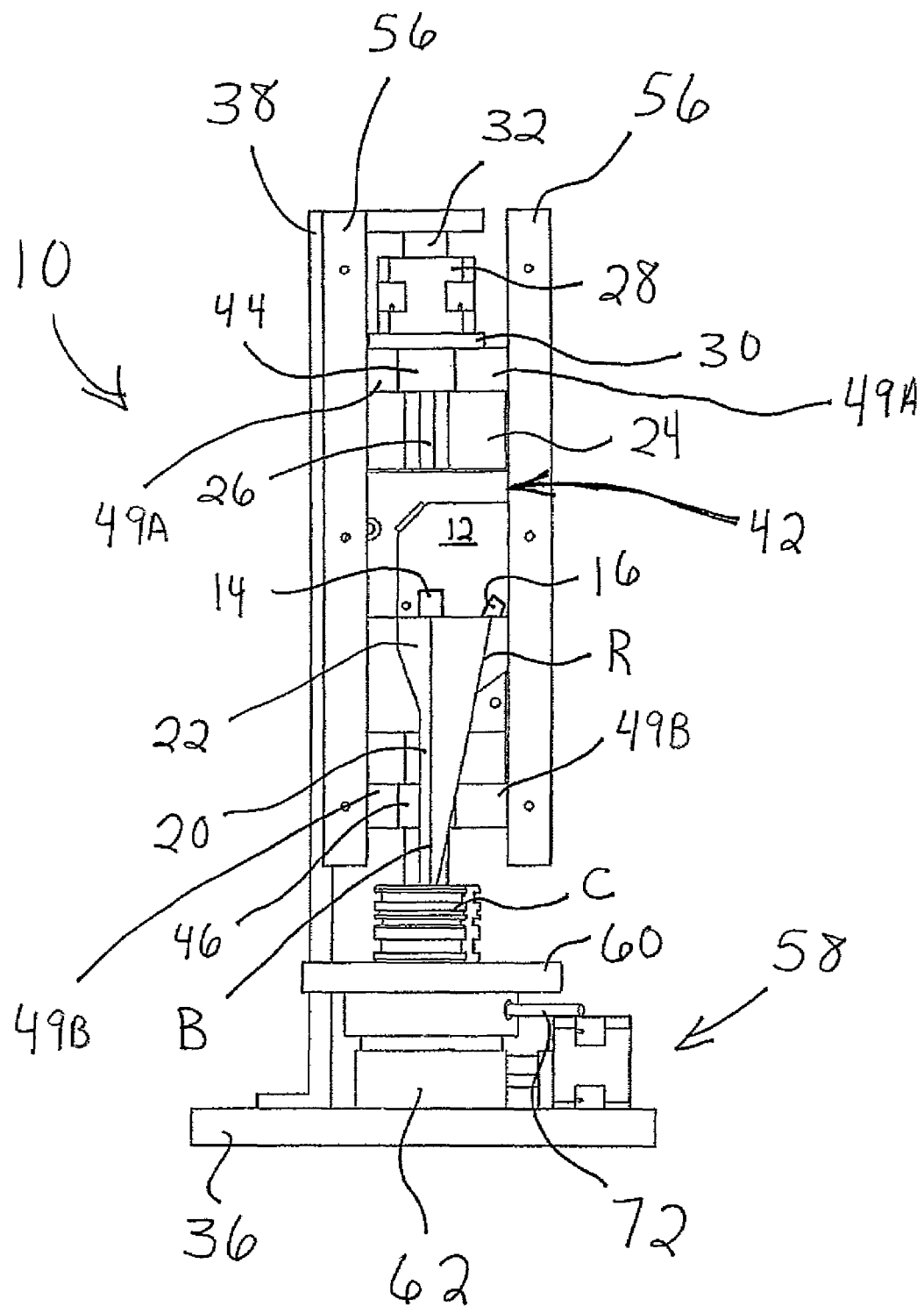
FIG. 4 is a front elevation view of the measuring device of FIG. 2.

The laser head 12 and beam redirection member 18 are mounted on a plate 22. The plate 22 is best illustrated in FIG. 3. The plate 22 has an elongated extension 20. The beam redirection member 18 is attached to the distal or lower end of the extension 20. The laser head 12 (not shown in FIG. 3) may be mounted to a proximal or upper end of the plate 22, with the laser source 14 generally aligned with the beam redirection member 18. The extension 20 is adapted to be moved into and out of the interior of a component C, as shown in FIG. 2, so it may be relatively small, with a width of approximately 0.500 inch, for example. This allows the distal end of the extension 20 and the associated beam redirection member 18 to fit within an internal bore of a small component C.

The plate 22 is mounted on the front face of a drive block 24, as shown in FIG. 3. A rotating drive shaft or lead screw 26 translates the drive block vertically. The lead screw engages internal threads (not shown) formed in a vertical bore through the drive block 24. The lead screw is driven by a motor 28 at the upper end of the measuring device 10. The motor 28 may be a step-motor or a servo-motor. It is mounted on a stationary motor platform 30. The lead screw 26 passes through a central opening (not shown) in the platform 30. In the illustrated embodiment, the motor 28 is associated with an encoder 32 for monitoring the number of motor rotations. The number of motor rotations determines the vertical position of the drive block 24 and, hence, the beam redirection member 18, which in turn allows a controller to determine the portion of the component C being analyzed, as described in greater detail below. Suitable motors and encoders, for example, include those sold by Haydon Switch & Instrument, Inc. of Waterbury, Conn.

The frame of the measuring device 10 includes an elongated post 34 which extends vertically and is secured to a base 36. A Z-shaped bracket 38 is fixed at one end to the base 36 and at the other end to the top of the post 24. The bracket stabilizes the post and prevents deflection of it. A carriage 40 has a longitudinal bore therethrough with a linear bearing in the bore. The linear bearing receives the post 34 to permit the carriage to slide easily up and down on the post. The drive block 24 is secured to the front of the carriage 40. The carriage 40 and its associated elements, i.e., the drive block 24, the plate 22, the laser head 12 and the beam redirection member 18, will be collectively referred to herein as the movable laser assembly 42. It can be seen that the interaction between the carriage 40 and the post 34 constrains the movable laser assembly 42 to strictly vertical motion.

Figure 5:
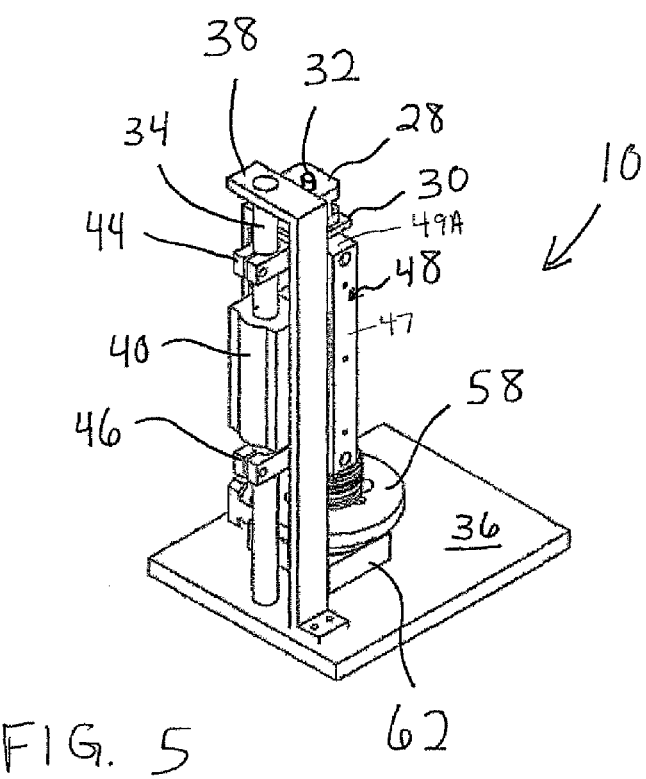
FIG. 5 is a rear perspective view of the measuring device of FIG. 2, with selected elements removed for clarity.
Figure 6:
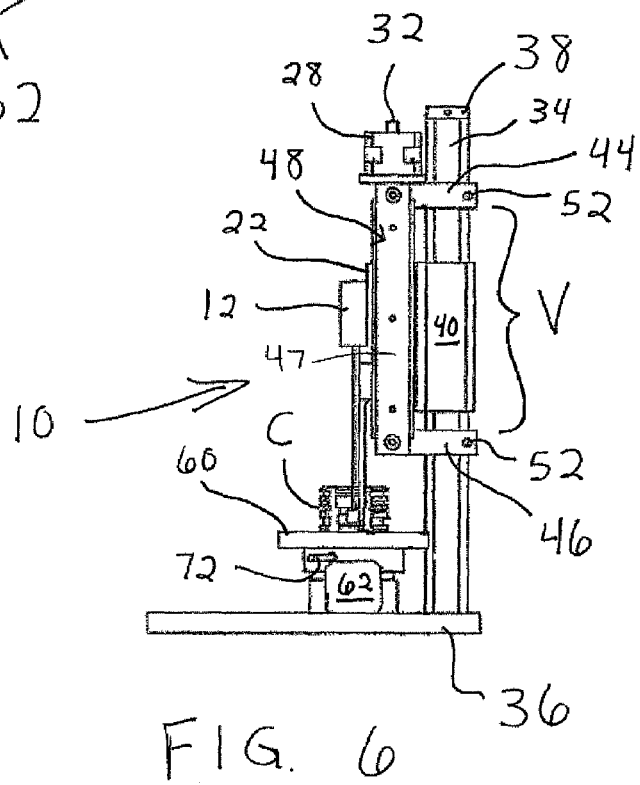
FIG. 6 is a right side elevation view of the measuring device of FIG. 2.

Upper and lower bracket heads 44 and 46 are adjustably fixed to the post 34. As seen in FIGS. 5 and 8, the rear portions of the bracket heads each have a pair of spaced arms on either side of an opening. The opening receives the post. The arms are connected by a set screw 52 which can be tightened to clamp the arms on the post and fix the location of the bracket heads. As seen in FIGS. 6 and 7, the bracket heads extend forwardly from the post and at their front ends they mount a pair of struts 48. Each strut includes an elongated, vertical bar 47 and upper and lower lateral projections 49A, 49B. The projections are bolted or otherwise fixed to the upper and lower ends of the vertical bar 47, respectively.

The range of vertical travel available to the movable laser assembly 42, and in particular the beam redirection member 18, is limited by the spacing between the upper and lower bracket heads 44 and 46. The range of travel available to the movable laser assembly 42 is generally designated at "V" in FIG. 6, which corresponds to the separation between the upper and lower bracket heads 44 and 46. In the embodiment of FIGS. 2-9, the motor platform 30 is secured to upper projections 49A of the struts 48. The struts 48 may also be provided with shims 50 (FIG. 8) that flank the drive block 24. The shims take up any undesirable space or compensate for wear.

As illustrated in FIG. 6, the set screws 52 may be loosened and the bracket heads 44 and 46 vertically adjusted to a selected position. Since the motor platform in attached to the upper bracket head 44 movement of the bracket heads 44 and 46 will also move the motor 28 and encoder 32. The movable laser assembly 42 is movable between the bracket heads. When the bracket heads 44 and 46 have been positioned to the desired location, which will depend primarily on the geometry of the component C and the dimensions to be analyzed, the set screws 52 are tightened to cause the bracket heads 44 and 46 to securely grip the post 34. The movable laser assembly 42 may be raised or lowered until the carriage 40 contacts one of the upper or lower bracket 44, 46.

To shield the laser beam B and return beam R from the outside environment, the measuring device 10 may be provided with a pair of side guards 54, separately securable to the struts 48 and oriented to extend forwardly, as shown in FIG. 2. A front opening between the side guards 54 may be bridged by a transparent window (not shown) connected on each side to front flanges 56 of the side guards 54. The window may be provided as a rectangular plate of transparent Lexan® or any other material suitable for laser shielding.

A stage 58 supports the subject component C and is mounted to the base 36 of the measuring device 10. The stage 58 may be fashioned according to any of a number of known designs. For example, suitable stages include stock nos. U38-195, U38-198, and U39-930 from Edmund Optics, Inc. of Barrington, N.J. Those of ordinary skill in the art will understand that a number of different stages may be used with a measuring device according to the present invention, based on the size, weight and geometry of the subject component, the dimensions to be analyzed, the number and type of required movement axes, and other factors. Selection of a suitable stage based on these considerations is within the ability of one of ordinary skill in the art.

Figure 13:
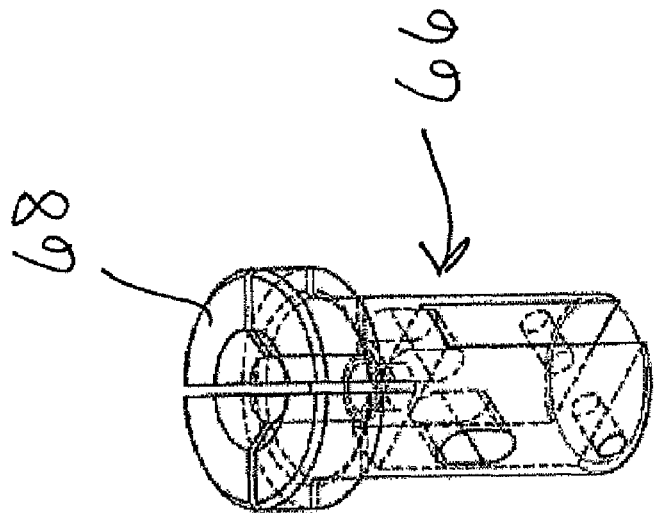
FIG. 13 is a front perspective view of a locating pin suitable for use with the stage of FIG. 12.
Figure 13:
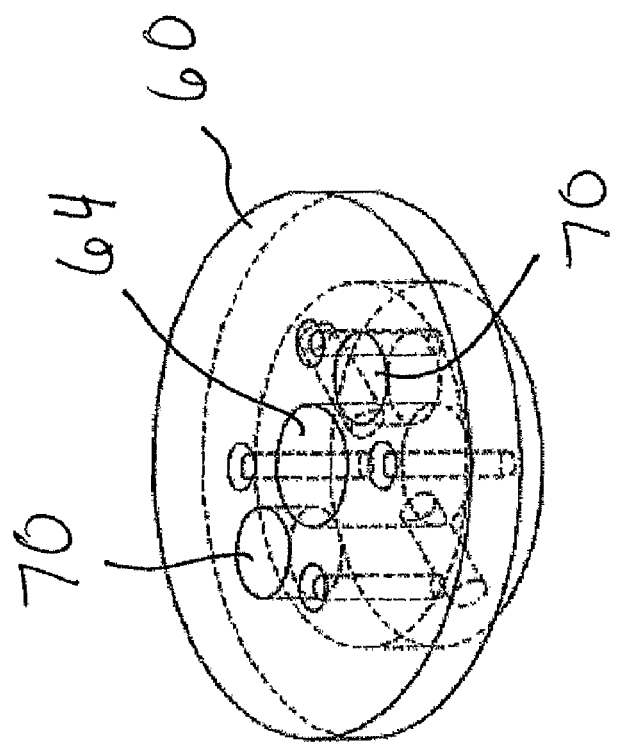

In general, the stage 58 has a platform 60, illustrated in FIG. 12, mounted on a stand 62. The stand 62 and/or the platform 60 may be removable and replaceable with different stands and/or platforms to adapt the measuring device 10 for use with varying subject components. In the illustrated embodiment, the platform 60 includes a central opening 64 that extends downwardly to receive a plug or locating pin 66, illustrated in FIG. 13. The plug 66 may be vertically adjustable by a cam (not illustrated) to move a plug head 68 above or below the top surface of the platform 60.

The platform 60 may also include one or more magnet sockets 70 radially spaced from the central opening 64. The magnet sockets 70 house magnets that maintain components comprised of magnetic materials in position for measurement. For components comprised of non-magnetic or paramagnetic materials, the plug head 68 may be extended above the top surface of the platform 60 to maintain the component C in position, as shown in FIG. 2. Of course, the plug head 68 may also be used in conjunction with the magnets for positioning components comprised of magnetic materials. However, the plug head 68 is typically retracted below the surface of the platform 60 to allow the beam redirection member 18 to be more fully advanced into the component interior during measurement of a component, as described in greater detail below.

In addition to the adjustable locating plug 66, the stage 58 may include a plurality of adjustment knobs 72 associated with the stand 62 and/or the platform 60. The adjustment knobs 72 may be used to raise, lower, rotate, tilt, and otherwise move the stage 58 for adjusting the position and orientation of a subject component C. The adjustment knobs 72 may be either automated or manually manipulated. That is, actuators could be connected to the knobs for manipulating the position or orientation of the stage's platform. Actuators could also be supplied to move the cam that controls the plug's position. Such actuators may be controlled by motion controllers such as a DMC-2183 available from Galil Motion Control, Inc. of Rocklin, Calif.

The use, operation and function of the measuring device 10 are as follows. A component C is delivered to the stage 58 and any necessary adjustments are made using the plug cam and/or adjustment knobs 72 to properly position the component C. Either before or after the component C is delivered, the location of the movable laser assembly 42 is set by adjusting the bracket heads 44 and 46 on the post 34.

Figure 11:
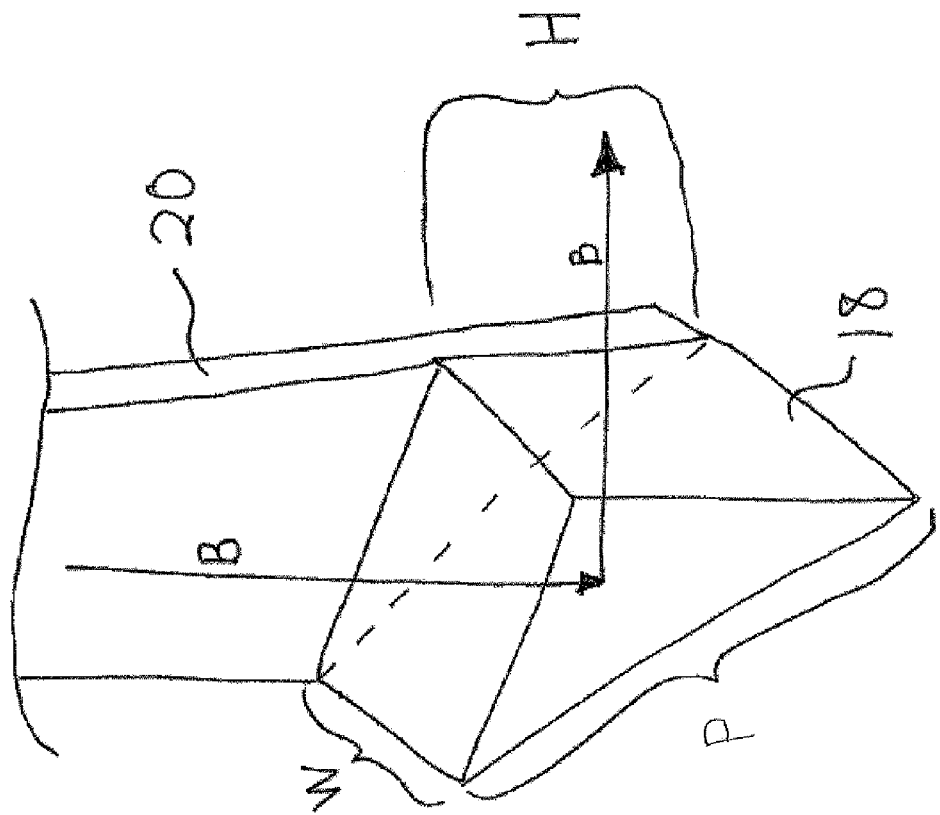
FIG. 11 is a front perspective view of a beam redirection member suitable for use with the measuring device of FIG. 2.

When the component C and movable laser assembly 42 are in the desired position, the motor 28 is operated to advance the movable laser assembly 42 downwardly until the beam redirection member 18 is aligned with respect to a feature of the component C to be measured. In the illustrated embodiment, the beam redirection member 18 is a right prism adapted to redirect a vertical laser beam B 90° to exit radially from the beam redirection member 18, as shown in FIG. 11. Thus, the beam redirection member 18 is vertically aligned with the feature to be measured, for example the inner surface of the component C in FIG. 2. It will be appreciated that such a feature could not be measured using a conventional measuring device, wherein the beam can only be reflected against a feature directly beneath the laser source. While the measuring device 10 is illustrated as measuring an internal surface dimension, the component C may be repositioned to measure a different dimension, such as an external surface dimension.

When the beam redirection member 18 is aligned with the feature to be measured, the laser source 14 is operated to direct a beam B downwardly to be intercepted by the beam redirection member 18. The beam redirection member 18 directs the beam B radially outwardly to strike the surface of the component C. The beam B is reflected off of the target area and returns to the beam redirection member 18, which redirects it back to the beam receptor 16 of the laser head 12 as an angled return beam R, illustrated in FIG. 4.

The data collected by the receptor 16 is processed by the laser head 12 and transmitted to a system controller (not shown). The system controller may include a microprocessor programmed to use the data from the beam receptor 16, along with the known positions of the laser source 14 and the receptor 16 to calculate the dimension of the target area. The measured dimension may then be displayed as an image or profile on a display associated with the control system, such as the screen of a laptop computer or a touch screen, or printed in spreadsheet form, or saved for future manipulation. The system controller may be programmed to produce an audible or visual signal or to implement an automatic rejection algorithm if the dimension of a component falls outside of a pre-selected target range. Furthermore, prior to measurement of a component, the motion controllers associated with the control system may be programmed to cause the measuring device to take a series of measurements at different positions of the component.

When the control system has finished measuring the component C, the movable laser assembly 42 is moved upwardly to remove the beam redirection member 18 from the component interior, if so disposed. Thereafter, the component C is removed from the stage 58, the locating plug 66 is returned to its original position, and the device is ready for the next component to be measured.

The various dimensions of an internal bore measurable by the measuring device 10 in a single run depends in part on the adjustability of the stage 58. For example, at least three different versions are contemplated. First, a single axis device is capable of moving the component upwardly or downwardly to check the Y-axis for the internal bore profile of the component. Second, a two-axis device is capable of moving the component vertically, as well as rotating the component about a vertical axis to check the Y-axis and the Z-axis, which allows for assessment of concentricity. Third, a three-axis device allows for vertical and rotational movement, along with lateral movement of a subject component which allows for the same measurements as the two-axis device, but also allows the component to be repositioned for measurement of the external profile.

Figure 14:
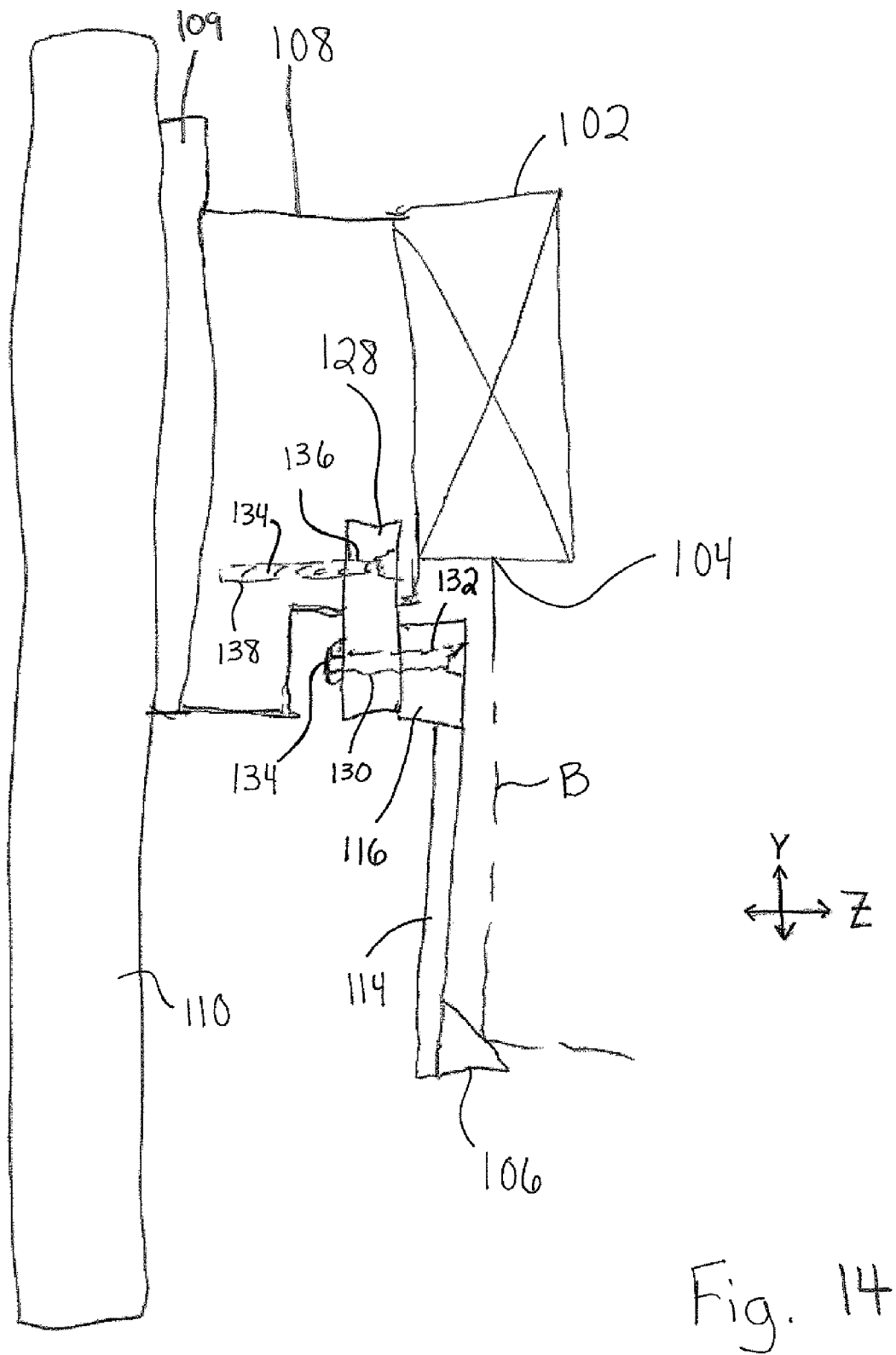
FIG. 14 is a left side elevational view of selected components of another embodiment of a laser-based measurement device according to the present disclosure.

Another embodiment of a measuring device 100 is illustrated in FIG. 14. The general structure and operation of the measuring device 100 can be understood with reference to the foregoing description of the embodiment of FIGS. 2-9, except as will be described in greater detail herein.

The measuring device 100 includes a laser head 102 with a laser source 104 (FIG. 15) and a beam receptor (not illustrated) according to the foregoing description of the laser head 12, laser source 14, and beam receptor 16. The laser source 102 directs a laser beam B downwardly, defining a vertical Y-axis. The beam receptor is spaced a known, fixed distance from the laser source 104 to receive the beam B as a return beam after it has been reflected off of a work piece C and redirected to the laser head 102 by a beam redirection member 106. The laser head 102 may be provided according to known design and it has been found that laser head model number LK-G152/G157 from Keyence Corporation of America of Woodcliff Lake, N.J. is suitable for use in the applications described herein.

In the embodiment illustrated in FIG. 14, the beam redirection member 106 is a mirror oriented at 45° with respect to the path of the beam B from the laser source 102. However, the beam redirection member is not limited to a mirror and may take any of a number of other forms, such as a prism or other optical device. The illustrated beam redirection member 106 changes the path of the beam B by 90° and directs it in a horizontal direction toward the front of the measuring device 100. The direction of the beam B away from the beam redirection member 106 is along an axis referred to herein as the Z-axis, which is horizontal and perpendicular with respect to the vertical Y-axis.

The laser head 102 is secured to a drive block 108, which in turn is attached to the slide saddle 109 of a slide or linear actuator 110. The slide 110 acts as a primary guide member, serving the same purpose as the post 34 illustrated in FIGS. 5 and 6, which is to guide the path of the movable laser assembly. It will be appreciated by those of ordinary skill in the art that the slide 110 and the post 34 are interchangeable and that other primary guide members may also be employed without departing from the scope of the present disclosure.

The movement of the drive block 108 and slide saddle 109 along the linear actuator 110 is achieved by a primary drive system (not illustrated) including a motor and an encoder, which function generally according to the foregoing description of the drive system of the embodiment of FIGS. 2-9. The motor may be a step-motor or a servo-motor and is actuated to move the drive block 108 and slide saddle 109 along the linear actuator 110. The encoder monitors the number of motor rotations and records the position of the motor to ensure that the movement of the drive block 108 and slide saddle during a measuring operation is repeatable.

Ideally, the primary drive system operates to move the slide saddle 109 and the attached drive block 108, laser source 104, and the beam redirection member 106 in a perfectly vertical direction along the primary guide member 110 thereby maintaining the integrity and position of the Y-axis. However, it has been found that the bearings of the linear actuator 110 may have sufficient imperfections, such as play or looseness, as to permit the slide saddle, and consequently the drive block 108, to move in a non-vertical direction, degrading the accuracy of the measuring device 100. This aspect of the linear actuator 110 will be addressed in greater detail below.

Figure 15:
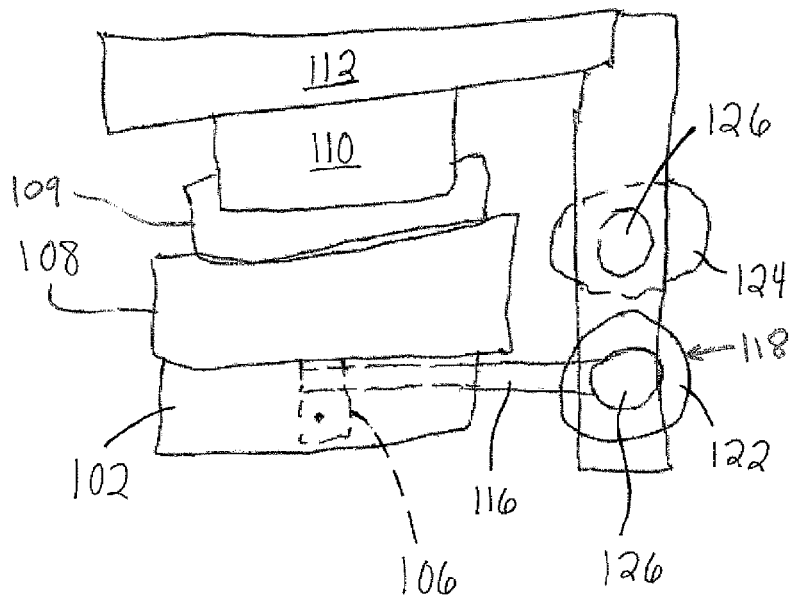
FIG. 15 is a top plan view of the stabilizing yoke assembly of FIG. 15, also including a laser head and a linear actuator.

In the embodiment of FIGS. 14 and 15, the linear actuator 110 is secured to a control box support 112. The control box support 112 may include any of a number of components, including elements of the primary drive system, an operating station for controlling the measuring device, and a system controller for performing calculations and processing collected data to produce measurements of a work piece.

The beam redirection member 106 is positioned directly below the laser source 102, mounted on a downwardly extending mounting leg 114 which is rigidly secured to or an integral extension of a stabilizing beam 116 of a yoke 118 (FIG. 15). The beam redirection member 106 is adapted to be moved into and out of the interior of a work piece C (FIG. 16), so the mounting leg 114 may be relatively small to allow the distal end of the mounting leg 114 and the associated beam redirection member 106 to fit within an internal bore of a small work piece C.

The yoke 118 is illustrated in greater detail in FIGS. 16-17. Typically, the yoke is comprised of a high-strength material to prevent deformation, particularly to prevent flexing of the stabilizing beam 116 during use. One end of the stabilizing beam 116 includes a linear bearing 120 which, in the illustrated embodiment, is connected to two other linear bearings 122 and 124. Bearing 122 is coaxial with the first linear bearing 120 and the two are joined by a vertical bar 121. The third linear bearing 124 is laterally spaced from the bearings 120 and 122. Bearing 124 is rigidly connected to the vertical bar 121 by a torque arm 123. The bearings 120, 122, 124 of the yoke are mounted for movement along a pair of yoke guide members 126 (FIG. 16). Preferably the yoke guide members are vertical posts which are held fixed with respect to the frame of the measuring device 100 by upper and lower supports 127. The yoke guide members 126 are parallel to the primary guide member 110 so, as will be described in greater detail herein, the yoke 118 is constrained for movement in a direction parallel to the primary guide member 110. The combination of the bearings' engagement with the posts 126, together with the bar 121 and the torque arm 123 prevents any twisting or canting of the yoke. This in turn constrains the stabilizing beam 116 and the mounting leg 114 to strictly vertical movement with no sway, twisting or canting.

In addition to the mounting leg 114, a deformable member 128 is also secured to the stabilizing beam 116 of the yoke 118, as shown in FIGS. 14 and 16-17. The deformable member 128 may be comprised of any material or structure suitable for absorbing vibrations, but in one embodiment the deformable member 128 is comprised of an elastomeric material, more particularly a rubber material. In the illustrated embodiment of FIGS. 14-17, the deformable member 128 is a rubber pad including a lower bore 130 aligned with a bore 132 in the stabilizing beam 116 to receive a connector 134, typically a screw or bolt, that secures the deformable member 128 to the stabilizing beam 116. If the mounting leg 114 is provided separately from the stabilizing beam 116, the connector 134 may be received in a bore of the mounting leg 114 to secure all three of the mounting leg 114, the stabilizing beam 116, and the deformable member 128 together.

The deformable member 128 is also secured to the drive block 108. In the illustrated embodiment, the deformable member 128 includes an upper bore 136 and the drive block 108 includes a bore 138, which bores receive a connector 134 to secure the deformable member 128 and the drive block 108 together. Hence, it will be seen that the drive block 108 is flexibly connected to the yoke 118 by the deformable member 128.

Figure 20:
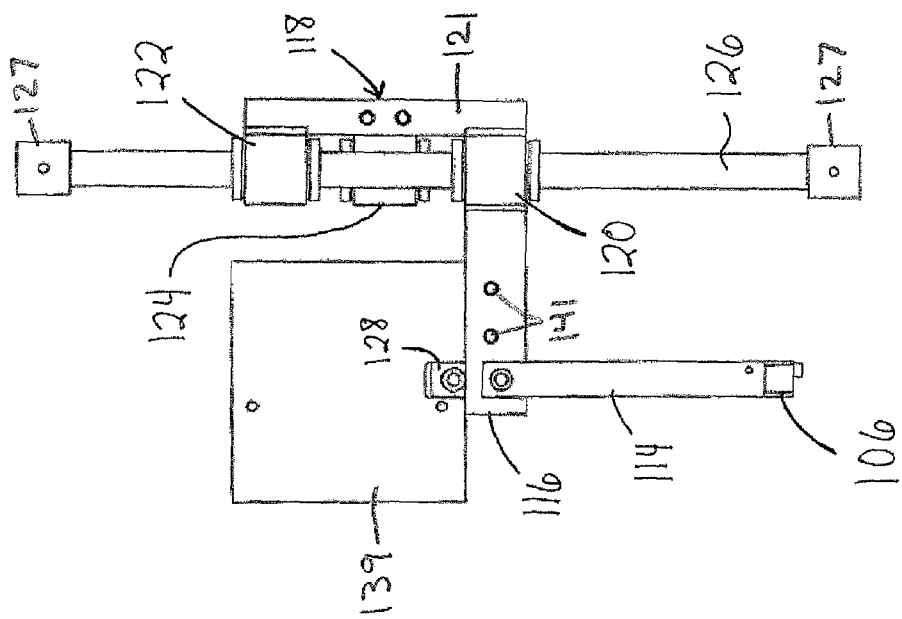
FIG. 20 is a front elevational view of the stabilizing yoke assembly of FIG. 18.
Figure 19:
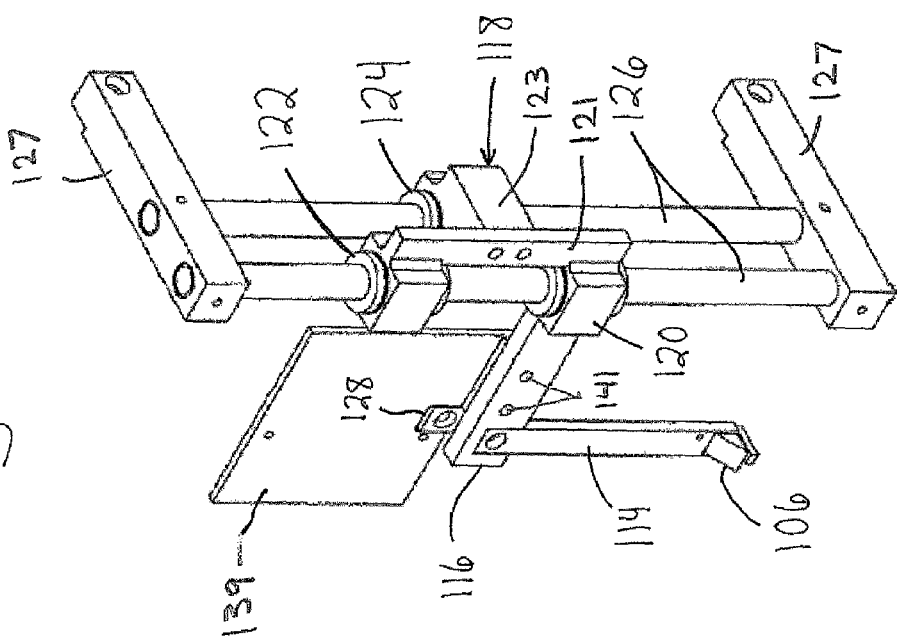
FIG. 19 is a side perspective view of the stabilizing yoke assembly of FIG. 18, looking generally from the right side of the device.

An alternate configuration of the measurement device is illustrated in FIGS. 18-20 and 24. This embodiment is similar to that of FIGS. 14-17 except in the manner in which the laser head 102 is attached. Here the laser head is attached to the yoke 118 instead of to the drive block. In particular, a laser support plate 139 is bolted at 141 or otherwise fastened to the stabilizing beam 116. Thus, the plate 139 moves with the stabilizing beam 116. The laser support plate is not attached to the drive block 108 but is separate from the drive block. A cutout portion of the laser support plate receives the deformable member 128 as seen in FIGS. 19 and 20. The laser head 102 is suitably mounted on and moves with the laser support plate 139.

A platform or stage saddle 140 supports the subject work piece C and is mounted to the base 142 of the measuring device 100, as shown in FIG. 18. It may be advantageous for the component C to be centered on the platform 140, which can be achieved in a number of ways. In the illustrated embodiment, the platform 140 includes a pair of locating dowels 144 (FIGS. 21 and 24) and a spring pusher 146 (FIGS. 18 and 24) which pushes a work piece against the dowels 144 to center the work piece on the platform 140. Other centering mechanisms include the system described previously with regard to the platform 60 of FIG. 12, so it will he appreciated by those of ordinary skill in the art that this embodiment is not limited to use with the illustrated platform, but may employ any of a number of different platforms.

Figure 21:
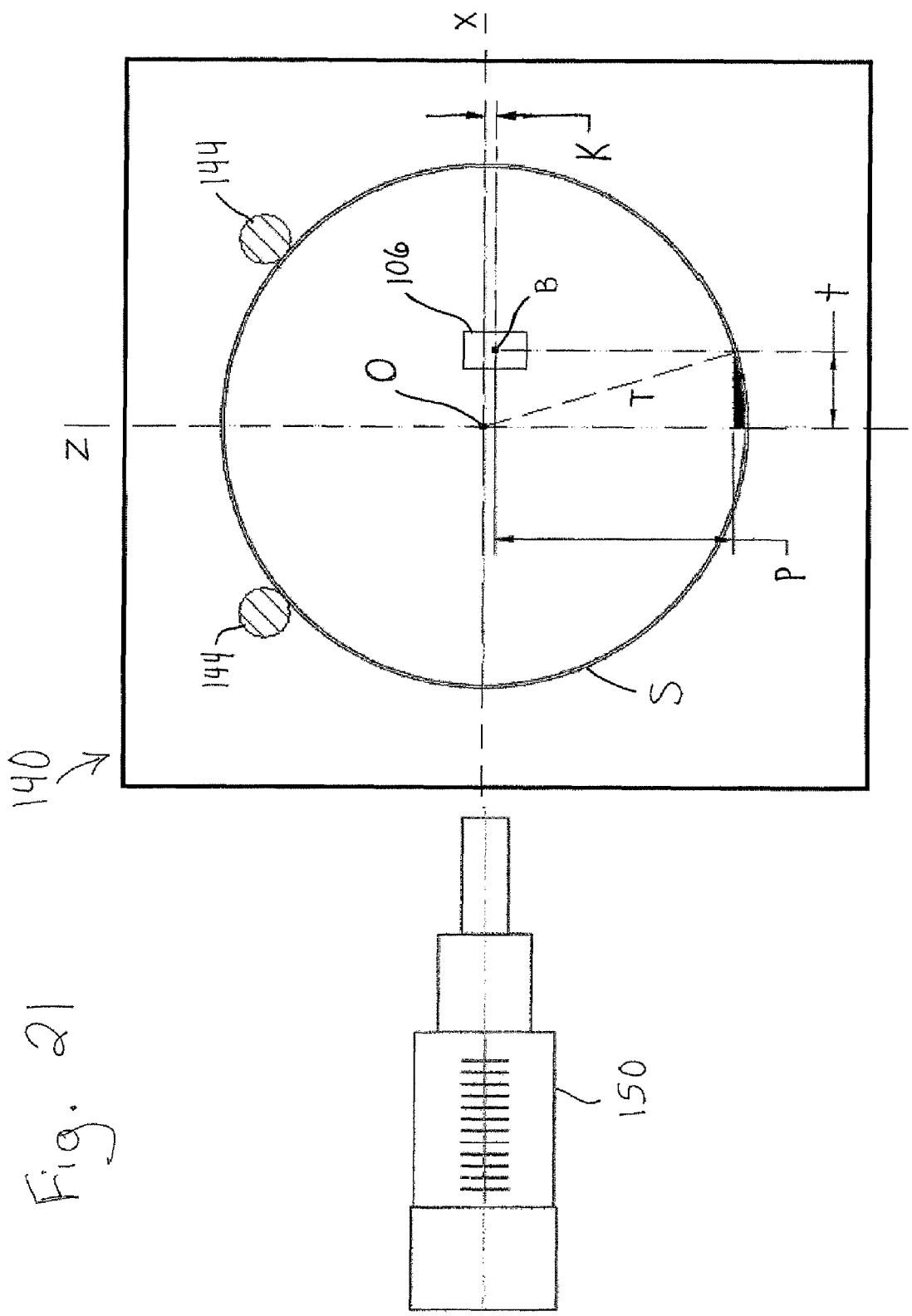
FIG. 21 is a top plan view of a platform suitable for use with the measurement device of FIG. 14.

In the illustrated embodiment, the platform 140 is movable with respect to the base 142 along the previously-defined Z-axis, i.e., in the same direction as the path of the beam B from the beam redirection member 106. As shown in FIG. 18, the platform 140 is moved along a track 148 by operation of a platform drive system which includes a motor and an encoder (not shown). The motor rotates a screwshaft to move the platform 140 along the Z-axis, while the encoder counts a preset number of steps per revolution of the servo or step motor, to ensure precise repeatability. The position of the platform 140 may also be adjusted in a horizontal X-axis, which is perpendicular to the Z-axis. FIG. 21 is a top plan view of the platform 140 and more clearly illustrates the orientation of the Z-axis and the X-axis. FIG. 21 also shows a graduated micrometer 150, which may be employed to adjust the position of the platform 140 along the X-axis. Alternatively, the movement of the platform along the X-axis may be controlled by another motor and encoder.

A safety feature in the nature of a lockout device is also shown in FIG. 18. A detector 152 is provided to assure the work piece is properly seated on the platform 140. The detector may be a light beam or the like focused at a height slightly above the known height of the work piece and somewhere between the home position of the platform and the working position of the platform. As the platform advances from the home position to the working position the work piece will pass beneath the detector beam if the work piece is properly seated on the platform. If the work piece is improperly seated, say for example one edge is resting on the spring pusher 146, the work piece will be canted and a portion of it will extend above its normal height. As this canted portion passes by the detector it will break the light beam. This causes the detector to send a signal to the system controller to stop movement of the platform. Preferably, the controller will then return the platform to its home position and display a message advising the operator that the work piece is improperly seated on the platform. This lockout feature prevents the taking of erroneous readings. It also prevents damage to the device which might otherwise result from a collision between a seriously mislocated work piece and the mounting leg 114 or the beam redirection member 106.

The use, operation and function of the measuring device 100 are as follows. A work piece C is delivered to the platform 140 and it is centered on the platform 140, if desired, such as by means of the spring pusher 146 and dowels 144. The platform drive system is then actuated to move the platform 140 and the work piece C into the proper position on the Z-axis. FIG. 18 illustrates the measuring device 100 being used to measure an inner radius of the work piece C, in which case the work piece C is centered on the platform 140 and the platform 140 is moved to place the center of the platform 140 directly under the beam redirection member 106 and the laser source 104, thereby aligning the central axis of the work piece C with the Y-axis.

When the work piece C is in the desired position, the primary drive system is operated to advance the drive block 108 downwardly. The downward movement of the drive block 108 is transmitted through the deformable member 128 to the yoke 118, thereby moving the yoke 118 down the yoke guide members 126. The motor of the primary drive system is actuated until the beam redirection member 106 is aligned with respect to a feature of the work piece C to be measured.

When the beam redirection member 106 is aligned with the feature to be measured, the laser source 104 is operated to direct a beam B downwardly to be intercepted by the beam redirection member 106. The beam redirection member 106 directs the beam B along the Z-axis to strike the target area of the work piece C. The beam B is reflected off of the target area and returns to the beam redirection member 106, which redirects it back to the beam receptor of the laser head 102 as an angled return beam.

The angle of the return beam is converted by the laser head 102 into a distance measurement which is transmitted to the system controller. The system controller uses the data from the beam receptor, along with the known positions of the laser source 104 and the receptor to calculate the dimension of the target area. The measured dimension may then be displayed as an image or profile on a display or touch screen associated with the control box support 112 or on the screen of a laptop computer, or printed in spreadsheet form, or saved for future manipulation. Prior to measurement of a work piece, the motion controllers associated with the system controller may be programmed to cause the measuring device to take a series of measurements at different positions or targets of the work piece.

When the system controller has finished measuring the work piece C, the motor of the primary drive system is driven in reverse to move the beam redirection member 106 upwardly to remove the beam redirection member 106 from the work piece interior, if so disposed. Thereafter, the platform 140 is retracted and the work piece C is removed from the platform 140 and the device is ready for the next work piece to be measured.

As mentioned previously, the actual operation of the primary drive system differs from the ideal operation. Ideally, the laser source 104 and the beam redirection member 106 move in a direction parallel to the primary guide member 110 to define a Y-axis which, in the illustrated embodiment is perfectly vertical. However, depending on the nature of the primary drive system and the primary guide member incorporated within the measuring device, there may be some "sway" of the movable laser assembly, and in particular the mounting leg 114 and the beam redirection member 106, as it moves along the primary guide member 110. As used herein, the term "sway" refers to the tendency of the movable laser assembly to move in the Z direction, slightly toward and away from the primary guide member 110 (and away from the ideal vertical Y-axis) as it is driven up and down. Sway may be caused by any of a number of factors, such as flatness variations in the bearings of the slide saddle 109 and/or an amount of play or looseness between the slide saddle 109 and the drive block 108.

Figure 22:
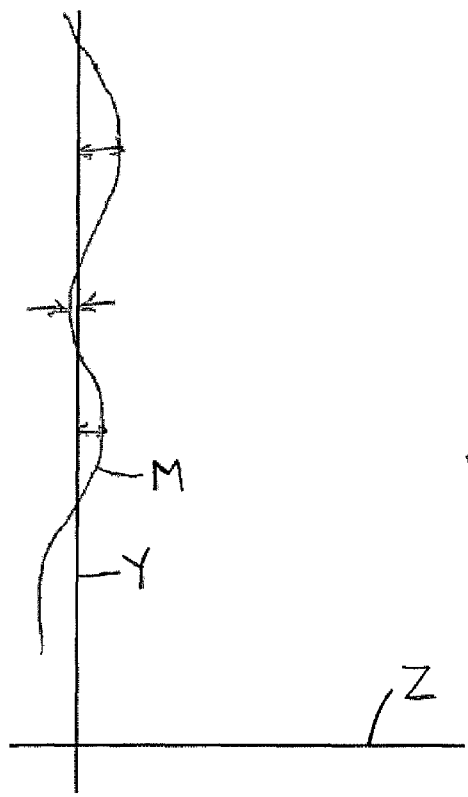
FIG. 22 is a diagram of a possible path of an unstabilized beam redirection member of the measurement device of FIG. 14, illustrating one of the problems addressed by the present disclosure.

FIG. 22 is a diagram of an actual path M that the beam redirection member 106 may follow if it were rigidly mounted on the drive block 108 as the movable laser assembly moves up and down the primary guide member 110. FIG. 22 represents a side view of the measuring device, with Y illustrating a perfectly vertical path or the Y-axis that is defined by the idealized path of the laser beam exiting the laser source or the idealized movement of the beam redirection member. The actual sway is typically small, with path M being exaggerated for illustrative purposes, but even a small deviation from the expected position of the beam redirection member 106 is significant if the subject work piece is to be measured to a high degree of accuracy. Furthermore, it will be seen that the displacement of the beam redirection member 106 from the Y-axis may vary at different vertical positions, which makes it even more difficult to reliably center the beam redirection member 106 (or to attempt to factor the amount of sway into the measurement calculation) and obtain accurate measurements of the work piece. Therefore, for the foregoing reasons, it has been found that it may be advantageous to eliminate sway, rather than to attempt to account for it in calculating the dimensions of the work piece.

The aforementioned deformable member 128 functions to eliminate sway in the yoke by absorbing any vibrations or distortions that would otherwise be transmitted from the swaying drive block 108 to the beam redirection member 106. Hence, the deformable member 128 is advantageously selected so as to transmit the vertical translation, but not the sway, of the drive block 108 to the yoke 118 and the beam redirection member 106. Accordingly, the yoke 118 moves up and down perfectly vertically, guided by the yoke guide members 126, and the beam redirection member 106 moves along the Y-axis without variation or sway.

A yoke 118 having the illustrated three-bearing configuration may be advantageous for eliminating sway, as the bearings and their connecting pieces cooperate to prevent rotation or sway in any direction, but other configurations may also be employed. Other possible configurations include, without being limited to, a yoke having a single bearing adapted to move along a single yoke guide member, a yoke having a pair of vertically aligned bearings adapted to move along a single yoke guide member, or a yoke having a pair of bearings each adapted to move along a separate yoke guide member.

Figure 23:
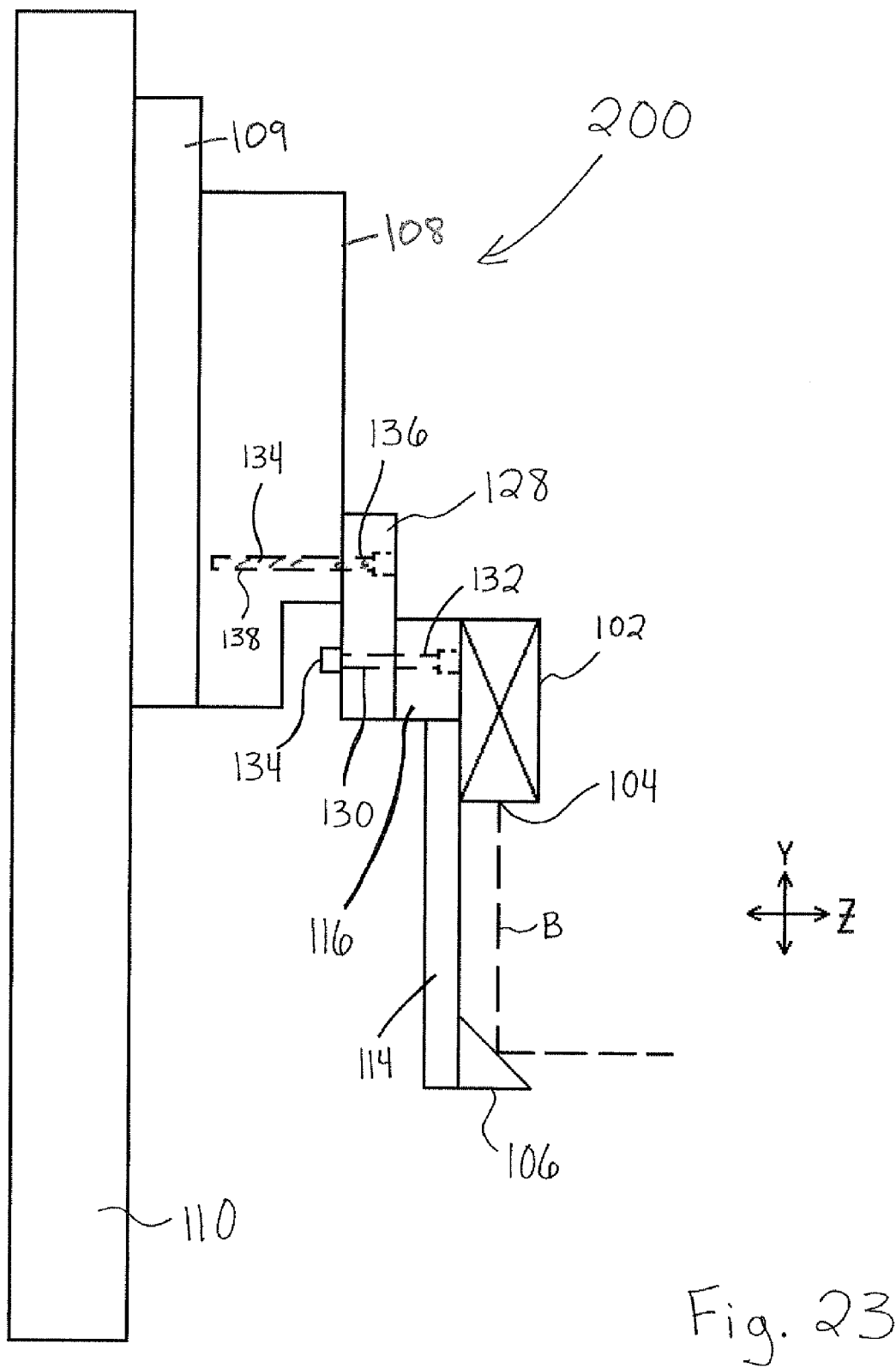
FIG. 23 is a left side elevational view of yet another embodiment of a laser-based measurement device according to the present disclosure.

According to another embodiment of a measuring device 200, illustrated in FIG. 23, the laser head 102 is secured to the stabilizing beam 116 instead of to the drive block 108 or mounting plate 139. The beam redirection member 106 is also secured to the yoke 118 (as in the embodiment of FIGS. 14-20), with the deformable member 128 secured between the yoke 118 and the drive block 108 to eliminate sway in the yoke 118, as described previously. This arrangement, as is also the case with the embodiment of FIGS. 18-20 and 24, may be advantageous because it assures that both the laser source and the beam redirection member move along the Y-axis without variation or sway and are always maintained in proper alignment with each other, thereby increasing the accuracy of the measuring device.

Other steps may also be taken to further improve the accuracy of the measuring device. The following calibration methods may be practiced separately or in combination with the various features of the foregoing measuring devices previously described herein.

The accuracy of the measurements taken by the measuring device is improved when the various components of the measuring device are actually positioned where they are expected to be positioned. For example, as described previously, the accuracy of the measuring device may be diminished if the beam redirection member is allowed to sway and move in a non-vertical direction, so a deformable member and yoke combination may be provided to eliminate sway. If the platform is not properly positioned during a measuring operation, which is of particular concern when employing a movable platform, it can similarly decrease the accuracy of the measuring device.

Two approaches, which may be practiced separately or together, are provided to obtain more accurate measurements using a movable platform. First, steps may be taken to assure that the platform is in a proper predetermined position prior to measuring a work piece. Second, once the predetermined position has been established (advantageously by using the first approach), a test case may be run to diagnose any variation in the position of the platform from the ideal position and generate a compensation factor to eliminate the effect of the variation.

According to the first approach, steps are taken to assure that the X-axis intersects the Y-axis defined by the laser beam. During preliminary set up of the measuring device, the center O of the platform 140 is located and the horizontal X-axis is defined to pass through the center O (FIG. 21). In one embodiment of the preliminary set up, a calibration laser is temporarily secured to the platform to project a horizontal beam through the center of the platform to visually define the X-axis. The motor of the platform drive system is then actuated to move the platform along the Z-axis until the beam of the calibration laser intersects the vertical beam from the laser source, i.e., until the X- and Y-axes intersect. This is done with the beam redirection member removed, to provide that the beam from the laser source continues straight down to meet the platform. In that condition, the position of the encoder for the motor of the platform drive system is noted. Subsequently, the motor can be activated to reproduce this encoder position with the assurance that when it does so, the X- and Y-axes will intersect at a centered position. The centered position is used, in combination with the motor and encoder, to position the platform at a predetermined position for measurement of a work piece, which may either coincide with the centered position or be spaced a distance from the centered position along the X-axis.

The second approach may be employed following the first approach or may be practiced independently or with a stationary platform. The second approach assumes that, regardless of the steps taken to properly position the platform, there will some difference between the actual predetermined position of the platform and the ideal predetermined position. This variation may be traced to any of a number of factors, such as imperfections in the operation of the platform drive system, which may sway and move the center of the platform out of alignment with Z-axis and, hence, the Y-axis defined by the laser source/beam redirection member/laser beam. Instead, nominal alignment is made and then the difference from perfect alignment is measured and a compensation factor is determined and stored for use with future measurements. FIG. 21 shows how this is accomplished.

FIG. 21 is a top plan view looking down on the surface of the platform 140 from just beneath the laser head. The center of the platform 140 is shown at O. A set-up piece S is disposed on the platform 140. The set-up piece has at least one known dimension which is measured by the measuring device to determine any variation between the ideal and actual position of the platform. In the illustrated embodiment, the set-up piece S is as perfectly cylindrical as can be made and the known dimension is the inner radius. The surfaces of the set-up piece are hardened and ground to within 0.0002 inch of parallel, vertical, and flat.

The set-up piece S is mounted on the platform 140 with the central axis of the set-up piece S being vertical and aligned with the center O of the platform 140. If provided, the mounting dowels 144 and the spring pusher 146 of the platform 140 will properly locate the set-up piece S on the platform 140. With the setup piece S centered on the platform, the task then becomes centering the platform with respect to the laser beam, i.e., the Y-axis.

With the set-up piece S positioned on the platform 140 with its axis coinciding with center O, the platform 140 is moved along the Z-axis until the center O of the platform 140 is aligned with the Y-axis (unless the platform is pre-positioned under the laser beam or provided as a stationary platform). If following the first approach described above, the motor of the platform drive system is driven until the encoder confirms that the platform is at the centering position. Ideally, the laser beam would come out of the laser source centered exactly on the X-Z intersection at the center O of the platform. But in reality the laser beam may be offset a distance t from the Z-axis. However, rather than trying to move the platform to perfectly center the laser beam and reduce t to zero, the offset distance t is calculated and subsequently used to calculate a deviation. The deviation can be used as a compensation factor for subsequent measurements.

During a set-up procedure, the beam redirection member 106 is lowered into the set-up piece S and a raw measurement P is taken. The inner radius T of the set-up piece S is known. Also, if the previously-described preliminary calibration is performed, or other suitable steps are taken to locate the X-axis, it is also known that the measured distance P is measured from the X axis. In other words, the laser beam B comes out of the laser head precisely on the X-axis and the distance K shown in FIG. 21 is zero. Thus, the measured distance P and the known radius T provide two sides of a right triangle, which allows calculation of the offset distance t. Those of ordinary skill in the art will appreciate that there are a number of other ways in which the offset distance t can be calculated given the known radius T and the measured distance P and this aspect of the present disclosure is not limited to a particular calculation method. Typically, the calculation is performed by the system controller, which uses the offset distance t as a basis for a compensation factor for future measurements which corrects the inherent deviation from the expected position of the target area of the work piece.

However, if adequate steps are not taken, the measurement P may be taken not from the X-axis but from a position spaced a distance K from the X-axis (FIG. 21). If the distance K is known, the offset distance t can be easily calculated with only minor variation to the previously described calculation method. However, if the distance K is unknown, a series of measurements of the inner radius of the set-up piece may be required to gather sufficient data so as to calculate the offset distance t and the distance K. Thereafter, both distances t and K or a plurality of offset distances t and K may be used to formulate a compensation factor for future measurements.

Measuring devices according to the present disclosure are useful as quality control units and may be incorporated either as an in-line production stage or as a separate stand-alone/bench model. Components may be automatically fed to the platform by a rotating disc infeed, a dial infeed, or in-line conveyor system or the like, especially if the measuring device is provided as an in-line production unit. Of course, work pieces may also be fed by hand.

While measuring devices according to the present disclosure are specially adapted to measure interior dimensions by a radially redirected laser beam, they may be adapted to take conventional measurements by removing the beam redirection member. When the beam redirection member has been removed, the laser source directs a laser beam B downwardly to reflect off of a target area beneath the laser source, according to standard practice.

It will be understood that the embodiments of the present disclosure which have been described are illustrative of some of the applications of the principles of the present invention. Numerous modifications may be made by those skilled in the art without departing from the true spirit and scope of the invention, including those combinations of features that are individually disclosed or claimed herein. For these reasons, the scope of the invention is not limited to the above description but is as set forth in the following claims. For example, while the illustrated embodiment shows a movable laser assembly traveling on the vertical axis, the stage could also be made to travel on the vertical axis to effect relative movement between the beam redirection member and the work piece.

I claim:

1. A measuring device for measuring a work piece, comprising:
   an elongated primary guide member;
   a drive block engaging the primary guide member for movement along the primary guide member;
   a drive system engageable with the drive block for moving the drive block along the primary guide member;
   a yoke constrained for movement in a direction parallel to the primary guide member;
   a deformable member secured between the drive block and the yoke;
   a laser source; and
   a beam redirection member in beam receiving relationship to the laser source, wherein at least one of the laser source and the beam redirection member is secured to the yoke.

2. The measuring device of claim 1 wherein the laser source is secured to the yoke.

3. The measuring device of claim 1 wherein the beam redirection member is secured to the yoke.

4. The measuring device of claim 1 wherein the laser source and the beam redirection member are secured to the yoke.

5. The measuring device of claim 1 further comprising at least one yoke guide member parallel to the primary guide member, wherein the yoke engages the yoke guide member for movement along the yoke guide member.

6. The measuring device of claim 1 further comprising a pair of yoke guide members parallel to the primary guide member, wherein the yoke engages the yoke guide members for movement along the yoke guide members.

7. The measuring device of claim 6 wherein the yoke engages at least one of said yoke guide members at two separate locations.

8. The measuring device of claim 1 wherein the yoke comprises a stabilizing beam and the deformable member and at least one of the laser source and the beam receptor is secured to the stabilizing beam of the yoke.

9. The measuring device of claim 8 wherein the deformable member includes a pair of bores, one of the bores receiving a connector to secure the deformable member to the stabilizing beam and the other bore receiving a connector to secure the deformable member to the drive block.

10. The measuring device of claim 1 wherein the laser source is adapted to direct a beam to the beam redirection member and the beam redirection member is adapted to change the direction of the beam from the laser source by approximately 90°.

\* \* \* \* \*